(No Model.)
J. SHERBONDY.
APPARATUS FOR MANUFACTURING PNEUMATIC TIRES.
No. 557,033. Patented Mar. 24, 1896.
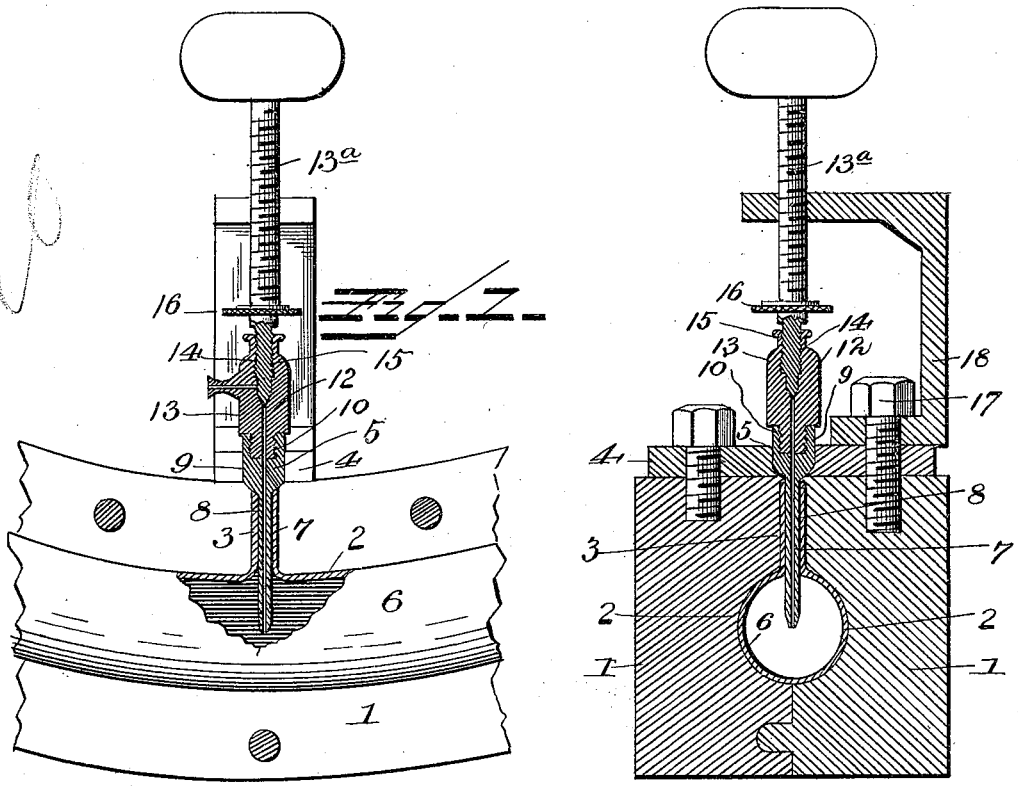
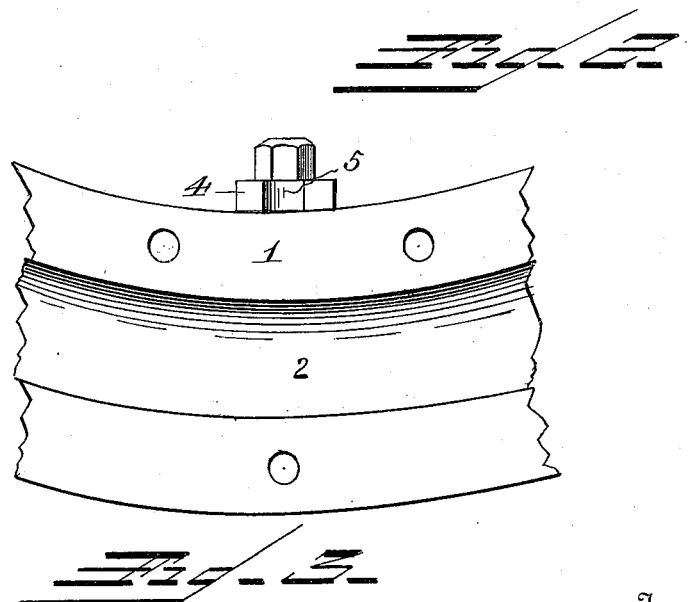
Witnesses:
F. L. Durand.
Inventor:
Joseph Sherbondy,
by Louis Bagger & Co.
Attorneys

UNITED STATES PATENT OFFICE.

JOSEPH SHERBONDY, OF AKRON, OHIO, ASSIGNOR TO THE DIAMOND RUBBER COMPANY, OF SAME PLACE.

APPARATUS FOR MANUFACTURING PNEUMATIC TIRES.

SPECIFICATION forming part of Letters Patent No. 557,033, dated March 24, 1896.

Application filed November 27, 1895. Serial No. 570,273. (No model.)

*To all whom it may concern:*

Be it known that I, JOSEPH SHERBONDY, a citizen of the United States, and a resident of Akron, in the county of Summit and State of Ohio, have invented certain new and useful Improvements in Apparatus for the Manufacture of Pneumatic Tires; and I do hereby declare that the following is a full, clear, and exact description of the invention, which will enable others skilled in the art to which it appertains to make and use the same, reference being had to the accompanying drawings, which form a part of this specification.

My invention relates to improvements in apparatus for manufacturing tires which are inflated with air, water, gas, or other fluids or liquids during the process of vulcanization, whereby the walls of the tire are forced against the sides of the mold and made to accurately conform to the same, and in addition to this, the tire being inflated, it is prevented from catching between the cheeks of the mold and being torn or damaged.

The invention consists in the novel construction and combination of parts hereinafter fully described and claimed.

In the accompanying drawings, Figure 1 is a longitudinal sectional view showing a mold for vulcanizing tires provided with my improved means for inflating the tire. Fig. 2 is a transverse section of the same. Fig. 3 is a detail view of one of the mold-sections, looking from the inside.

In the said drawings the reference-numeral 1 designates the mold-sections, which are circular in form and provided on their inner or meeting sides with semicircular grooves 2, which coincide with each other where the sections are connected together. These sections are also formed with smaller semicircular grooves 3 intersecting said grooves 2 and extending to the edge of the sections. Secured to said sections are metal plates 4 formed at their inner edges or ends with semicircular recesses 5.

The numeral 6 designates the rubber tire to be vulcanized formed with a tubular stem 7, and in this stem is located a tube 8, having an enlarged outer end 9, formed with interior screw-threads 10, with which engages the correspondingly-threaded end of a valve-coupling 12, formed with an enlarged screw-threaded head 13 and an intersecting air-supply tube, which is connected by any suitable means with an air or other pump, (not shown,) and fitting in this head is a valve 14, formed with screw-threads 15 and provided with a milled head or turning-wheel 16.

Bolted to one of the plates 4, by means of a bolt 17, is a bracket 18, having its upper end bent at a right angle and formed with a screw-threaded aperture through which passes a clamping-screw 13$^a$.

The operation of the device is as follows: The tire to be vulcanized is first inflated sufficiently to insure its not being caught between the cheeks of the mold, and this is accomplished in the following manner: The tube 8 is inserted in the stem 7, which fits it very tightly. The valve being open, the tire is inflated by means of an air-pump or other instrument suited to the substance used for inflation, connected with the valve-coupling. The tire is then placed in the mold, the valve opened only enough to admit the free passage of the air, and the tire is then fully inflated to a pressure of about ninety pounds to the square inch. When the tire is completely inflated the valve is closed and the clamping-screw 13$^a$ is screwed down thereon to prevent the escape of air or other substance used, and when vulcanization is complete the valve is opened to allow the air or other substance to escape, and the tire is then removed from the mold. The valve proper, consisting of the tube 8 and the valve-coupling 12, is thus divided to facilitate its manufacture and operation, it being impracticable to manufacture a valve in one piece having so small a hole in the tube 8.

The plates 4 are divided so that the mold may be opened without loosening them, and the object of using the plates is to support the stem or tube 8 and to center it, for if the tube 8 stands at an angle the walls of the tubular stem 7 will be of irregular thickness and the air will escape through the plies of the cloth used in the stem when the tire is used a short time.

Having thus fully described my invention, what I claim is—

1. In an apparatus for vulcanizing pneumatic tires, the combination with the mold-sections, circular in form and provided on their inner sides with semicylindrical grooves and with intersecting semicylindrical grooves at their meeting ends, and the plates secured to said sections formed with semicylindrical grooves, of the tube located in said intersecting grooves, provided with a valve-coupling, the air-tube connected therewith and the valve and means for operating the same, substantially as described.

2. In an apparatus for vulcanizing pneumatic tires, the combination with the circular mold-sections formed with semicylindrical grooves upon their inner sides, and with intersecting semicylindrical grooves at their meeting ends, the plates secured to said sections formed with semicylindrical grooves, and the bracket secured to one of said plates, of the tube located in the intersecting grooves of the mold-sections, having an enlarged upper end formed with a screw-threaded recess, the coupling connected therewith, the intersecting air-supply tube, the screw-threaded valve engaging with the upper end of said coupling, the screw-threaded clamping-screw passing through said bracket, and the milled head on the upper end of the valve against which the clamping-screw presses, substantially as described.

In testimony that I claim the foregoing as my own I have hereunto affixed my signature in presence of two witnesses.

JOSEPH SHERBONDY.

Witnesses:
  G. M. ANDERSON,
  WM. A. MARTIN.